(12) United States Patent
Yoshioka

(10) Patent No.: US 6,793,477 B2
(45) Date of Patent: Sep. 21, 2004

(54) INJECTION MECHANISM OF INJECTION MOLDING MACHINE

(75) Inventor: Mitsushi Yoshioka, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/839,135

(22) Filed: Apr. 23, 2001

(65) Prior Publication Data

US 2001/0041197 A1 Nov. 15, 2001

(30) Foreign Application Priority Data

Apr. 24, 2000  (JP) ........................................ 2000-121984

(51) Int. Cl.⁷ ............................................. B29C 45/17
(52) U.S. Cl. ........................ 425/150; 425/569; 425/574
(58) Field of Search ................... 425/574, 569, 425/150, 149; 264/40.7, 328.11

(56) References Cited

U.S. PATENT DOCUMENTS

| | | | | |
|---|---|---|---|---|
| 4,895,505 A | * | 1/1990 | Inaba et al. ................. | 425/145 |
| 5,679,384 A | * | 10/1997 | Emoto ........................ | 425/145 |
| 5,818,666 A | * | 10/1998 | Chaya ........................ | 360/106 |
| 6,051,896 A | * | 4/2000 | Shibuya et al. .............. | 310/12 |
| 6,206,683 B1 | | 3/2001 | Takahashi et al. ........... | 425/589 |

FOREIGN PATENT DOCUMENTS

| | | |
|---|---|---|
| EP | 0280743 | 9/1988 |
| EP | 0744815 A2 | 11/1996 |
| JP | 62-025022 | 2/1987 |
| JP | 62-173137 | 7/1987 |
| JP | 63-060720 | 3/1988 |
| JP | 63-269822 | 11/1988 |
| JP | 11058468 | 3/1999 |
| JP | 11-058468 | 3/1999 |
| JP | 11-239897 | 9/1999 |
| JP | 11-309752 | 11/1999 |

* cited by examiner

Primary Examiner—Benjamin L. Utech
Assistant Examiner—Emmanuel S. Luk
(74) Attorney, Agent, or Firm—Staas & Halsey LLP

(57) ABSTRACT

A tetragonal prism having a rectangular cross section is attached, as a linear motor movable section, to a moving plate to which a screw is attached rotatably and also immovably in an axial direction. A magnet is attached to each surface of the movable section. A hole section is provided in an outer frame. A linear motor coil is provided on the linear motor fixed section so that it may face the magnet on the surface of the movable section. A screw shaft is rotated by a motor through a measuring shaft penetrating a center of the movable section. By driving the linear motor comprising the magnet and the coil corresponding to each other, the screw is moved and injected in an axial direction. The fixed section is detachable and a gap between the magnet and the coil can be easily adjusted.

10 Claims, 4 Drawing Sheets

INJECTION MECHANISM OF INJECTION MOLDING MACHINE

BACKGROUND OF THE INVENTION

1. Field of the Invention

The present invention relates to an injection mechanism of an injection molding machine and particularly relates to an injection mechanism of an injection molding machine using a linear motor as a driving source of the injection mechanism.

2. Description of the Prior Art

An injection mechanism for driving an injection screw of an injection molding machine in axial direction using a motor is already well known. A mechanism for driving this injection screw in the axial direction using a linear motor is also well known by, for example, Japanese Patent Application Laid-Open Nos. 11-58468 and 63-1516 and the like.

In case of an injection mechanism using a conventional linear motor, the linear motor is incorporated integrally into the injection mechanism. Due to this, it is disadvantageously difficult to replace or adjust the linear motor. The linear motor is constituted such that a very small gap is formed between a linear motor movable section (or a needle) making a linearly movement and a linear motor fixed section (or a stator) to thereby allow the movable section to move relatively to the fixed section. The magnitude of this gap influences motor performance. If the linear motor gets out of order and it is necessary to replace it with another linear motor, the replacement operation is difficult to carry out because of the fact that the linear motor is incorporated into the injection mechanism. Further, the adjustment or the like of the gap between the fixed section and the movable section stated above is disadvantageously difficult to make.

OBJECTS AND SUMMARY OF THE INVENTION

It is an object of the present invention to make it possible to reduce dangerous operation using the magnetic force of a linear motor when the linear motor is replaced or repaired and also to easily adjust the gap between the magnet of the linear motor and a coil in the injection mechanism of an injection molding machine using the linear motor as a driving source for longitudinally driving an injection screw shaft.

According to the present invention, an injection mechanism using a linear motor is constituted so that the fixed section of the linear motor extending in an axial direction and facing the movable section of the linear motor linked to the screw shaft and extending in the axial direction is arranged and that a plurality of pairs constituted of an outer frame into which the fixed section is fixedly attached are combined to surround the screw shaft.

In particular, the linear motor movable section is constituted of a polygonal prism having a plurality of pairs of planes parallel to each other. The movable section is linked to an injection screw. Further, the electrical elements of the linear motor are arranged on these pairs of two parallel planes, respectively. On the other hand, the linear motor fixed section is fixedly attached to the outer frame so that the electrical elements of the fixed section face the electrical elements of the linear motor movable section, respectively.

Moreover, the linear motor fixed section has a structure of being detachably attached to the outer frame so that the electrical elements of the fixed section face the electrical elements of the linear motor movable section, respectively. Alternatively, a hole section is provided in the outer frame, a lid closing the hole section is used as the linear motor fixed section and the electrical elements of the linear motor fixed section are fixedly attached to the inside of the lid.

BRIEF DESCRIPTION OF THE DRAWINGS

The foregoing and other objects and features of the invention will become apparent from the following description of the preferred embodiments of the invention with reference to the accompanying drawings, in which.

DETAILED DESCRIPTION OF THE PREFERRED EMBODIMENTS

Figure 1:
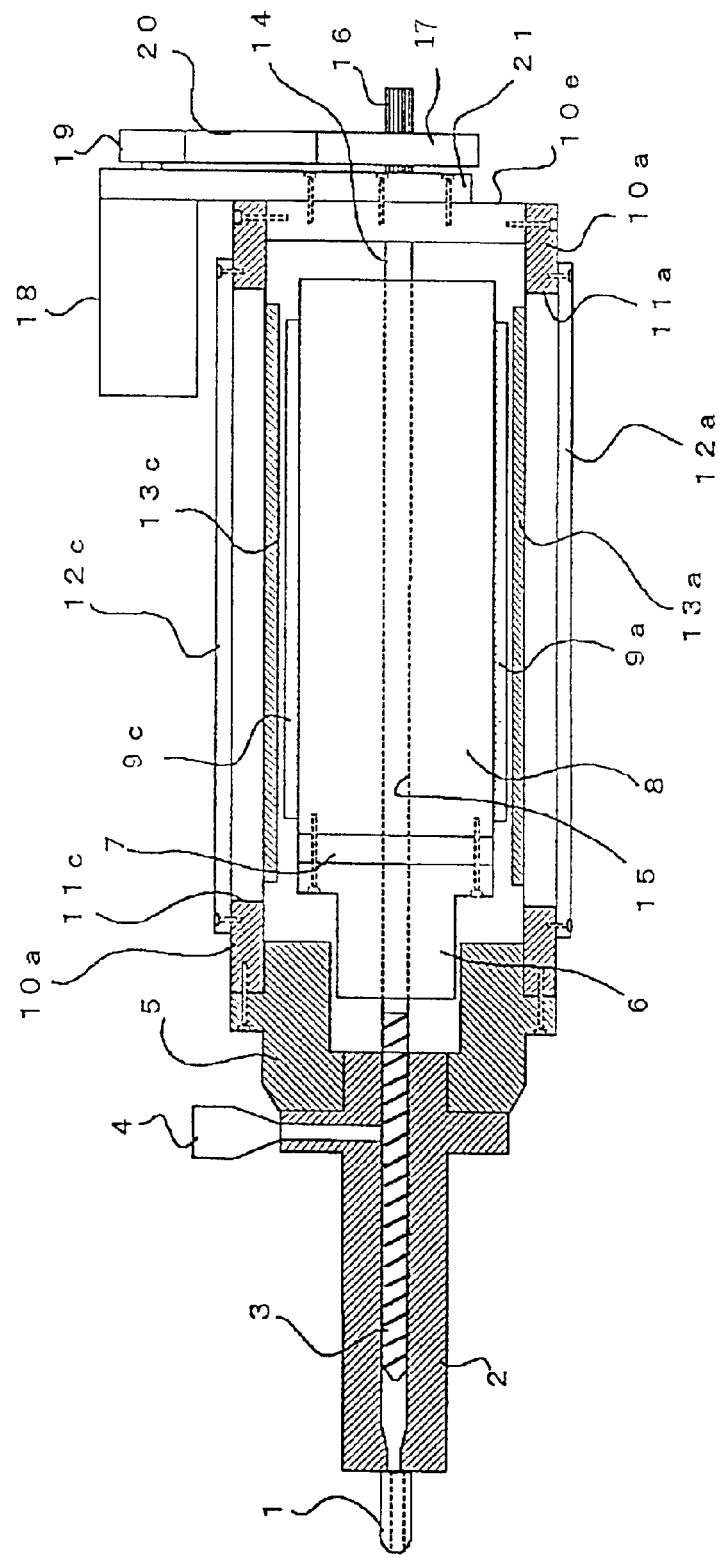
FIG. 1 is a partially cross-sectional view of the important parts of an injection mechanism in one embodiment according to the present invention.

FIG. 1 is a partially cross-sectional view of the principal parts of an injection mechanism in one embodiment according to the present invention.

A cylinder 2 is attached to a front plate 5. A nozzle 1 is attached to the tip end of the cylinder 2. An injection screw 3 is inserted into the cylinder 2. The injection screw 3 mixes and melts a resin material inputted from a hopper 4 and injects the resultant resin material into a die which is not shown. The rear end shaft of the screw 3 is rotatably but axially immovably attached to a moving plate 6. The screw 3 has a structure in which this rear end shaft is linked to a measuring shaft 14 to be described later and in which the screw 3 rotates in response to the rotation of the measuring shaft 14 to be described later.

Figure 2:
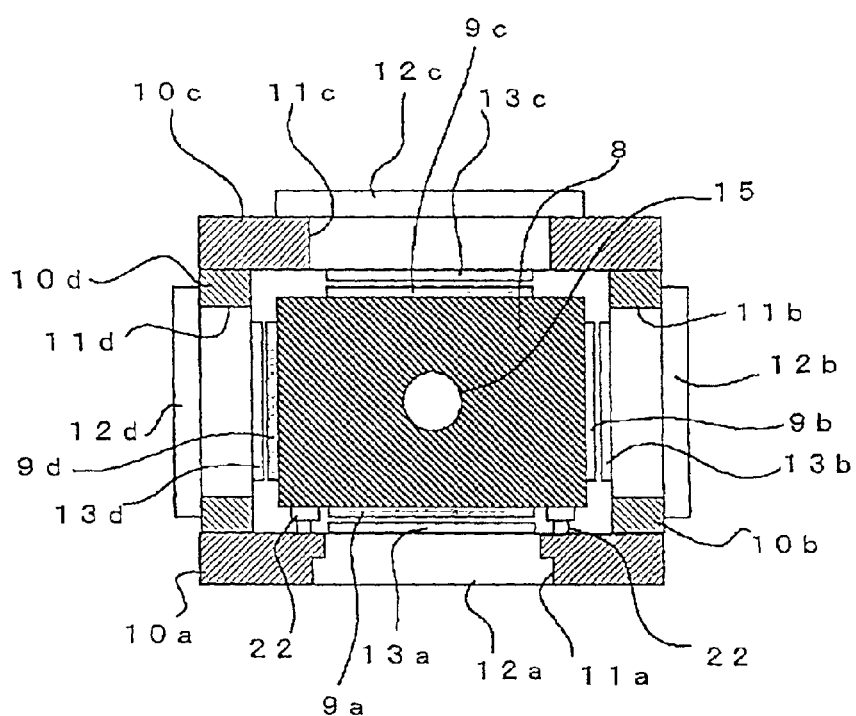
FIG. 2 is a cross-sectional view showing that the central portion of a linear motor section is cut in the longitudinal direction of a sheet in this embodiment.

A linear motor movable section 8 constituting the linear motor is fixed to the moving plate 6 through a load cell 7. The linear motor movable section 8 comprises a polygonal prism having a plurality of pairs of planes parallel to each other. In this embodiment, the movable section 8 comprises a tetragonal prism having a rectangular cross section as shown in FIG. 2. FIG. 2 is a cross-sectional view showing that the linear motor section shown in FIG. 1 is cut at the center. As shown in FIG. 2, four magnets 9a, 9b, 9c and 9d which are one of the electrical constituent elements of the linear motor are arranged on the four surfaces of the linear motor movable section 8 comprising a tetragonal prism, respectively, which surfaces are parallel to the axial line of the screw 3.

Further, an outer frame 10 constituting the linear motor is fixedly attached to the front plate 5. Holes are formed in the outer frame 10 in regions facing the respective surfaces of the linear motor movable section 8 (or the respective planes of the polygonal prism), respectively and the linear motor fixed section is provided to face the linear motor movable section 8.

The outer frame 10 in this embodiment comprises a bottom frame 10a, side frames 10b and 10d and a top frame 10c. Hole sections 11a to lid are provided in the respective frames 10a to 10d. Linear motor fixed sections 12a to 12d are detachably attached to the frames 10a to 10d to serve as lids of the hole sections 11a to 11d, respectively.

Figure 3:
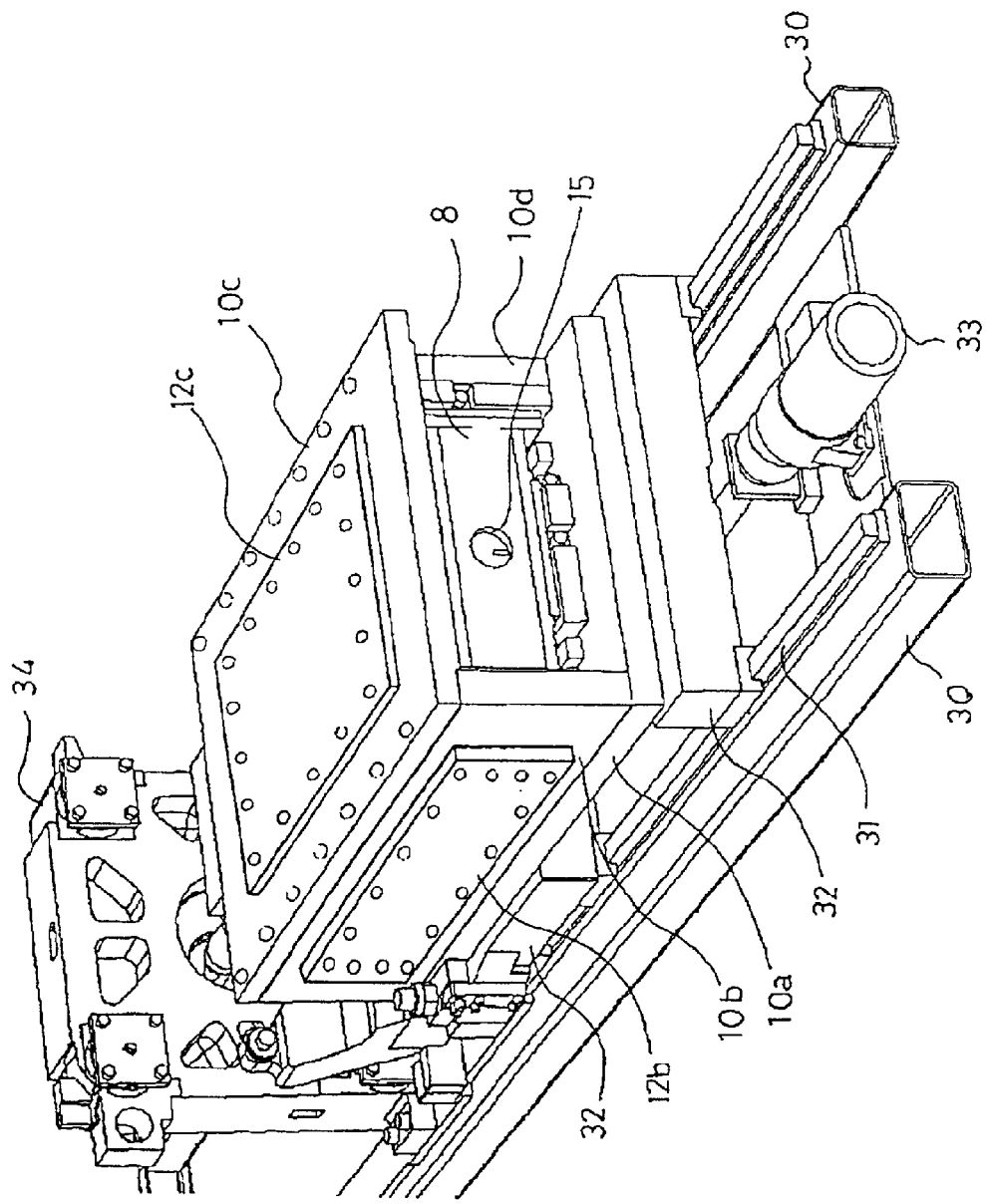
FIG. 3 is an explanatory view for a state in which the injection mechanism is incorporated into an injection molding machine in this embodiment.
Figure 4:
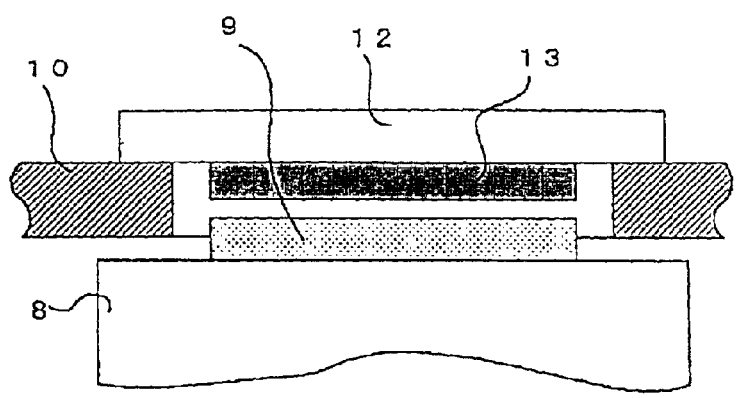
FIG. 4 shows an example of a linear motor section in case of forming a compact injection mechanism in another embodiment according to the present invention.

The linear motor fixed sections 12b, 12c and 12d attached to the both side frames 10b, 10d and the top frame 10c have outside portions formed into flanges, respectively, which flange portions are fixed to the respective frames 10b, 10d and 10c by bolts or the like. In addition, the linear motor fixed section 12a attached to the bottom frame 10a is formed to be flush with the outer surface of the bottom frame 10a and fixed to the bottom frame 10a at a position at which the fixed section 12a does not have an effect on a nozzle touch driving mechanism, since the nozzle touch driving mechanism for moving the injection mechanism to make the nozzle 1 touch the die is arranged below the bottom frame 10a, as shown in FIG. 3 to be described later.

Coils 13a to 13d serving as electrical constituent elements of the linear motor fixed sections are provided on the respective linear motor fixed sections 12a to 12d so that the coils face the respective magnets 9a to 9d.

The magnets 9a to 9d of the linear motor movable section 8 and the coils 13a to 13d of the linear motor fixed sections 12a to 12d face one another with small gaps formed therebetween, respectively. Since the characteristics of the linear motor varies according to the magnitudes of the gaps, it is necessary to adjust the gaps.

According to the present invention, the linear motor fixed sections 12a to 12d are attached to the respective outer frames 10a to 10d. By holding adjustment members such as shims between the linear motor fixed sections 12a to 12d and the frames 10a to 10d and fixing the adjustment members with bolts, respectively, the adjustment of the gaps can be made.

Further, when replacing the coils 13a to 13d of the linear motor, it suffices to replace only the fixed sections 12a to 12d themselves, thereby simplifying a replacement operation. Besides, when repairing the fixed sections 12a to 12d of the linear motor is made, it suffices to detach the fixed sections 12a to 12d from the outer frames 10a to 10d to thereby dispense with a dangerous operation suffering a magnetic force.

The linear motor movable section 8 is held by linear guides 22 and 22 (see FIG. 2) provided on the bottom frame 10a so as to be linearly movable in the axial direction of the screw 8. The linear motor movable section 8 also has a penetrating hole 15 provided at the center thereof, into which hole the measuring shaft 14 is inserted. The measuring shaft 14 linked to the shaft of the screw 3 passes through this penetrating hole 15, protrudes from the rear end portion of the linear motor movable section 8, further passes through the frame 10e on the rear end side of the outer frame 10 and is supported by a motor attachment plate 21 fixedly attached to the rear end frame 10e. Furthermore, the measuring shaft 14 is formed with a spline groove 16 in the rear end portion and a pulley 17 is coupled to this spline groove 16.

A screw rotation motor 18 for rotating the screw 3 to thereby mix, melt and measure a resin is attached to the motor attachment plate 21 attached to the rear end frame 10e of the outer frame 10. A belt 20, such as a timing belt, is between the pulley 19 fixed to the output shaft of the motor 18 and the pulley 17 spline-linked to the measuring shaft 14.

FIG. 3 shows a state in which this injection mechanism is attached to the base of an injection molding machine and in which the measuring shaft 14, the rear end-side frame 10e and the screw rotation motor 18 have been detached.

The outer frame 10 of the injection mechanism is attached onto a mounting member 32. The mounting member 32 is attached by linear guides 31 provided on the base 30 of the injection molding machine so as to be linearly movable in a direction either toward or away from a fixed platen 34 to which the die is attached.

A motor 33 drives the injection mechanism to make the nozzle touch the die. Namely, by driving the mounting member 32, the outer frame 10 (i.e., injection mechanism) attached to the mounting member 32 is moved forward and backward and the nozzle 1 is press-contacted with the die attached to the fixed platen 34 or detached from the die.

The injection mechanism in this embodiment is constituted as stated above. Pairs of the magnets 9a to 9d provided on the respective surfaces of the linear motor movable section 8 and the coils 13a to 13d provided on the respective linear motor fixed section facing the magnets 9a to 9d, constitute linear motors, respectively. That is to say, the magnet 9a and the coil 13a, the magnet 9b and the coil 13b, the magnet 9c and the coil 13c and the magnet 9d and the coil 13d constitute linear motors, respectively. This follows that four linear motors are applied to one linear motor movable section 8, thereby making it possible to generate a great force.

In addition, the pair of the magnet 9a and the coil 13a and that of the magnet 9c and the coil 13c constitute the respective linear motors on the surfaces parallel to each other. Since the coils 13a and 13c are located in directions in which both the coils face each other, forces repelling the linear motor movable section 8 are cancelled each other. Also, the pair of magnet 9b and the coil 13b and that of the magnet 9d and the coil 13d constitute the respective linear motors on the surfaces parallel to each other. Since the coils 13b and 13d are located in directions in which the both coils face each other, forces repelling the linear motor movable section 8 are cancelled each other. As a result, no excessive load is not exerted on the linear guides 22 guiding the linear motor movable section 8.

In case of the tetragonal prism as shown in this embodiment, four linear motors can be provided. If a linear motor movable section is constituted of a polygonal prism having a plurality of pairs of surfaces parallel to each other, e.g., a polygonal prism having a regular hexagonal cross section, then six linear motors can be provided and three pairs of linear motors each of which pair are arranged on the surfaces of the linear motor movable section parallel to each other, thereby making it possible to cancel forces acting on a perpendicular direction to the direction of the screw shaft each other. It is noted that the cross section of the polygonal prism should not necessarily be a regular polygonal shape and a linear motor movable section can be constituted of a polygonal prism having a plurality of pairs of surfaces parallel to each other.

In the above-stated embodiment, in an injection step, linear motors comprising the pair of the magnet 9a and the coil 13a, that of the magnet 9b and the coil 13b, that of the magnet 9c and the coil 13c and that of the magnet 9d and the coil 13d, respectively are driven synchronously with one another and the linear motor movable section 8 is guided by the linear guides 22 to thereby drive the movable section 8 in left direction in FIG. 1. By doing so, the moving plate 6 fixedly attached to the linear motor movable section 8 through the load cell 7 and the screw 3 attached rotatably and axially immovably to the moving plate 6 move linearly together with the linear motor movable section 8 and the molten resin stored in the cylinder 2 is injected.

In a measuring step, the screw rotation motor 18 is driven, the measuring shaft 16 is rotated through the pulley 19, the belt 20 and the pulley 17 and the screw 3 linked to the measuring shaft 16 is rotated, thereby mixing and melting the resin. At this time, back pressure is applied to the resin by driving the four linear motors stated above. Since the back pressure is low, only a pair of upper and lower linear motors or a pair of left and right linear motors may be driven synchronously with each other.

In the above-stated embodiment, the hole sections 11a to 11d are provided in the outer frame 10 and the linear motor fixed sections 12a to 12d are fixedly attached to the hole sections 11a to 1id as lids, respectively. Alternatively, linear motor fixed sections may be provided on the outer frame 10 itself. Specifically, coils 13a to 13d may be directly arranged on the bottom frame 10a, the side frame 10b, the top frame 10c and the side frame 10d, respectively. In the latter case, however, gap adjustment disadvantageously becomes more difficult than that in the above-stated embodiment.

Moreover, if the injection mechanism is requested to be configured compact, the magnitude of the injection mechanism can be made small by allowing the magnets 9 and the coils 13 to face one another within the thickness of the outer frame 10. In the above embodiment, the electrical constituent elements of the linear motor movable section are magnets and those of the linear motor fixed sections are coils. Alternatively, the constituent elements of the movable section and the fixed sections may be reversed. That is, the electrical constituent elements of the fixed sections may be magnets and those of the movable section may be coils. It is also possible to provide linear motors which do not use magnets.

According to the present invention, it is possible to reduce a dangerous operation due to the magnetic force of the linear motor at the time of replacing or repairing the linear motor and to easily adjust gaps between the magnets and the coils of the linear motor.

What is claimed is:

1. An injection mechanism of an injection molding machine using a linear motor as a driving source for driving an injection screw shaft in the axial direction, wherein the linear motor comprises:

a movable section linked to the injection screw shaft and extending in the axial direction;

an outer frame; and a fixed section detachably attached to the outer frame and extending in the axial direction while facing the movable section, wherein a plurality of the linear motors each comprised of the movable section, the outer frame and the fixed section are arranged to surround the screw shaft, wherein the fixed section of each of the linear motors is detachably attached to the outer frame so that electrical elements of the fixed section face electrical elements of the movable section of each of the linear motors, respectively.

2. An injection mechanism of an injection molding machine according to claim 1, wherein the movable section of each of the linear motors comprises a polygonal prism having a plurality of pairs of planes parallel to each other, and electrical elements of each of the linear motors are provided on the two planes parallel to each other, respectively; and the fixed section of each of the linear motors is fixedly attached to the outer frame so that electrical elements of the fixed section face the electrical elements of the movable section of each of the linear motors, respectively.

3. An injection mechanism of an injection molding machine according to claim 1, wherein one end of the screw shaft is attached to a moving plate constituting the injection molding machine such that it can rotate but cannot move linearly, and the movable section of each of the linear motors is fixed to the moving plate.

4. An injection mechanism of an injection molding machine according to claim 3, wherein the movable section of each of the linear motors is fixed to the moving plate through a load cell.

5. An injection mechanism of an injection molding machine according to claim 2, wherein the movable section of each of the linear motors is comprised of a prism having a rectangular cross section, and electrical elements of the linear motors are provided on four planes of the prism, respectively.

6. An injection mechanism of an injection molding machine according to claim 1, wherein a cylinder for containing inside the injection screw shaft is attached to a front plate constituting the injection molding machine, the outer frame constituting the linear motor is fixedly attached to the front plate.

7. An injection mechanism of an injecting molding machine according to claim 1, wherein the outer frame and the fixed section constitute one linear motion.

8. An injection mechanism of an injection molding machine according to claim 1, wherein a linear guide for linearly moving the movable section is formed on one constituent member of the outer frame.

9. An injection mechanism of an injection molding machine according to claim 1, wherein a measuring shaft is linked to one end of the screw shaft, and the measuring shaft passes through a penetrating hole provided in a center of the movable section.

10. An injection mechanism of an injection molding machine using a linear motor as a driving source for driving an injection screw shaft in the axial direction, wherein the linear motor comprises:

a movable section linked to the injection screw shaft and extending in the axial direction;

an outer frame; and a fixed section detachably attached to the outer frame and extending in the axial direction while facing the movable section, wherein a plurality of the linear motors each comprised of the movable section, the outer frame and the fixed section are arranged to surround the screw shaft, wherein a hole section is provided in the outer frame, the fixed section of each of the linear motors is comprised of a lid closing the hole section, and electrical elements of the fixed section of each of the linear motors are fixedly attached to an inside of the lid.

* * * * *

UNITED STATES PATENT AND TRADEMARK OFFICE
CERTIFICATE OF CORRECTION

PATENT NO. : 6,793,477 B2
DATED : September 21, 2004
INVENTOR(S) : Mitsushi Yoshioka It is certified that error appears in the above-identified patent and that said Letters Patent is hereby corrected as shown below:

Column 2,
Line 66, please change "lid" to -- 11d --.

Column 5,
Line 11, please change "lid" to -- 11d --.

Signed and Sealed this

Fifteenth Day of February, 2005

JON W. DUDAS
*Director of the United States Patent and Trademark Office*